Feb. 28, 1961 M. LEVY 2,972,781
METHOD OF DEFORMING PLASTIC ARTICLES
Filed Nov. 5, 1957

INVENTOR
MORRIS LEVY
BY
ATTORNEY

United States Patent Office 2,972,781
Patented Feb. 28, 1961

2,972,781
METHOD OF DEFORMING PLASTIC ARTICLES

Morris Levy, Teaneck, N.J., assignor to David Kahn, Inc., Hudson, N.J., a corporation of New Jersey Filed Nov. 5, 1957, Ser. No. 694,614

13 Claims. (Cl. 18—56)

The present invention is directed to a method for deforming plastic articles. More particularly, the invention is directed to a method of forming lateral projections on a plastic tube, said tube to be used as an ink cartridge for ball point writing instruments.

At the present time, cartridges for ball point writing instruments are made from a metallic tube having lateral projections thereon for seating the spring which forms part of the project-retract mechanism of ball point writing pens.

It is highly desirable to make such cartridges from plastics primarily because plastics can be transparent and thereby provide means for the user of the pen to determine at a glance whether there is a sufficient ink supply in the pen.

However, it has not been possible until the present invention to make such plastic cartridges in a simple continuous manner. The cheapest and most practical method of forming a plastic tube is by extrusion. However, it is extremely difficult to subsequently add the spring retaining lateral projections to an extruded plastic tube.

The present invention is directed to a method for providing a plastic tube with the necessary projections in a simple manner.

In one aspect of the present invention, a portion of a plastic article such as a tube, formed by extrusion or otherwise, is subjected to pressure sufficient to exceed the elastic limit of the plastic but just short of the rupturing point of the plastic. The pressure is then released. Although the plastic material springs back to a certain extent, the pressure is sufficient to cause the plastic to remain in a deformed condition.

More particularly, the pressure is applied to the plastic article or tube by means of a die, the face of said die being at an angle with respect to the direction of movement of said die. The angular positioning of the face of the die makes a sharp indentation at the point of contact with the plastic article and causes sufficient flow of plastic to result in a substantially permanent deformation of the plastic.

In the preferred embodiment of the present invention, the tube is positioned between opposed dies, the face of one die being at an angle with respect to the face of the other die. More specifically, at least one die has a generally semi-cylindrical groove in the face thereof, the face of said die being rearwardly disposed in a lateral direction from said groove at an angle to a plane perpendicular to the axis of the die. Preferably, the groove divides the face into two sections, each section being rearwardly disposed in a lateral direction from said groove at an angle to a plane perpendicular to the axis of the die.

In utilizing the dies, the tube is positioned in the opposed grooves of the dies and pressure is applied to urge the dies toward each other. By providing that the width of the groove is less than the external diameter of the tube, the angularly disposed faces of the dies engage the wall of the tube to outwardly displace the plastic and form projections on the tube.

The present invention is used to produce a novel deformed plastic tube having the lateral projections thereon. Such a tube has a longitudinal opening therethrough and an intermediate portion having arcuate lateral projections, said projections defining a plane substantially parallel to the axis of the tube, the cross-sectional shape of the longitudinal opening in the intermediate portion being generally oval-shaped but with the minor axis having narrow tapered radial extensions, the major axis being perpendicular to said plane, the length of the major axis not exceeding the diameter of the longitudinal opening on either end of said intermediate portion, the combined length of the minor axis and its extensions being greater than the external diameter of the tube on either end of said intermediate portion. Furthermore, the wall of the tube defining the opening through the intermediate portion is thickest at the extremities of the extensions of the minor axis.

In order to successfully deform a plastic tube in the manner described, the tube must comprise a tough, stiff, flexible and resilient synthetic organic plastic, preferably nylon or a high ethylene polymer.

The most desirable plastic to be used is a synthetic resinous high polymer of ethylene known as high density polyethylene. This high density polyethylene, also known commercially as Ziegler or Phillips high density polyethylene, is a linear, highly unbranched, highly crystalline, high density polyethylene. This preferred polyethylene is generally made by what is presently known as a low pressure method although recently there has appeared on the market high density polyethylene having the desirable characteristics but which is made by processes utilizing higher pressures.

It has been discovered that when utilizing such a synthetic plastic or resin, particularly when utilizing high density polyethylene, excellent results have been obtained when the pressure applied to the tube during deformation is approximately 2,000 pounds per square inch. However, satisfactory results can be obtained when the pressure varies between 1,500 and 3,000 pounds per square inch. When utilizing other plastic materials, the minimum pressure may be more or less than preferred with polyethylene, and the desirable pressure range may vary considerably.

Furthermore, when utilizing the preferred high density polyethylene, in order to apply the pressure in a proper manner to cause sufficient plastic flow and to result in permanent deformation of the tube wall without rupturing the plastic, the face of the die preferably forms an angle of approximately 5° with a plane perpendicular to the axis, or direction of movement, of the die. In other words, when utilizing two opposed similar dies, the opposed, or mating surfaces of the dies, define an angle of approximately 10°.

For a complete understanding of the present invention, reference is made to the following description and the appended drawing.

The plastic cartridge of the present invention is constituted by an ink carrying tube 1 in which is inserted a ball point writing tip 2. The tube has a longitudinal opening 4 therethrough and an intermediate portion having arcuate lateral projections 3 on either side thereof, said projections defining a plane substantially parallel to the axis of the tube.

Figure 1:
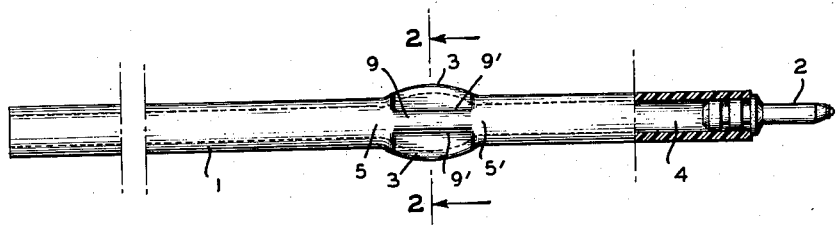
Fig. 1 is a plan view, partly in section, of the cartridge of the present invention.
Figure 2:
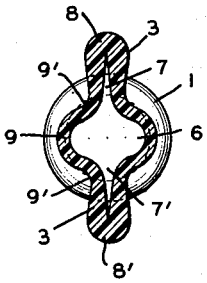
Fig. 2 is a cross-section taken along the line 2—2 of Fig. 1.

The cross-sectional shape of the intermediate portion, as shown in Fig. 2, is defined by a generally oval-shaped opening 6, the minor axis thereof, that is the smaller axis of the oval, having narrow tapered radial extensions 7 and 7' lying in the plane defined by the arcuate radial projections 3.

The major axis of the oval-shaped opening 6 is perpendicular to said plane, and the length of the major axis does not exceed the diameter of the longitudinal opening on either end 5, 5' of the intermediate portion and preferably is less than the diameter of the longitudinal opening.

The wall of the intermediate portion defining the opening is thickest at the extremities 8, 8' of the extensions 7, 7' of the minor axis.

This thick wall defines the arcuate shape of the lateral projections and is of substantially uniform thickness throughout the length of the intermediate portion. The central longitudinal section 9 of the intermediate portion is defined by straight edges 9'.

The combined length of the minor axis and the extensions 7, 7' is greater than the external diameter of the tube on either end of the intermediate portion. In other words, the opening in the intermediate portion extends into the lateral projections.

The lateral projections 3 serve as a seat for a helical spring (not shown) which is positioned around tube 1 between projections 3 and writing point 2. The spring provides a means for retracting the writing unit into the pen casing as is conventional in project-retract ball point pens.

Figure 3:
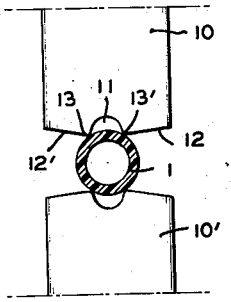
Fig. 3 is a view of the tube positioned between opposed dies prior to the application of pressure.
Figure 4:
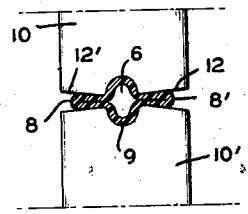
Fig. 4 is a view similar to Fig. 3 showing the position of the dies and the cross-sectional shape of the tube during the application of pressure.

The intermediate portion is preferably formed by an apparatus diagrammatically illustrated in Figs. 3 and 4. The tube 1, having generally uniform internal and external diameters, and preferably produced by extrusion, is positioned between opposed dies 10 and 10'. The dies encompass the intermediate portion of the tube 1.

Pressure is applied to urge dies 10 and 10' toward each other, the pressure being sufficiently great to exceed the elastic limit of the plastic, but insufficient to rupture or tear the plastic. At the end of their travel, the dies are positioned as shown in Fig. 4 and the intermediate portion of the tube 1 is deformed as shown in the same figure. At this time, the opening 6 in the intermediate portion is generally oval-shaped, the minor axis having substantially no tapered radial extensions.

The pressure which urged the dies together is now released and as a result of the spring-back of the plastic which constitutes tube 1, the opening 6 defines the shape shown on Fig. 2. In other words, when the pressure is released, there are provided the above described tapered radial extensions 7 and 7' in the minor axis of opening 6.

As can be seen from the drawings, the face of each die is defined by sections 12 and 12' which are separated by a groove 11. The sections 12 and 12' are rearwardly disposed in a lateral direction from the groove 11 to define an angle 14 with reference to a plane 15 perpendicular to the axis of the die. It is evident that these face sections 12 and 12' define an angle with respect to the respective sections of the other die.

When sections 12 and 12' apply pressure to a segmental portion of the tube 1, that is, a portion of the tube laterally spaced from the axis of the tube, the pressure causes outward flow of the wall of the segmental portion to produce the lateral projections on the tube.

It is apparent that because of the angle of the sections of the die, the greatest pressure is applied to the radially inward portions of the segmental portions, the pressure decreasing toward the radially outward extremities of the segmental portions.

As has been pointed out above, the plastic tube comprises a tough, stiff, flexible and resilient organic plastic, preferably nylon or a high ethylene polymer. Stated differently, the mechanical properties of the plastic are such that the plastic will not rupture under the applied pressure and will maintain the deformation resulting from the flow of the plastic, when the pressure is released. The most desirable and preferred plastic is a synthetic resinous high polymer of ethylene known as high density polyethylene. As hereinafter further described, when utilizing such a plastic, the angles and radii of the dies are of special significance in order to properly deform the plastic in such a manner that the resultant deformation maintains its dimensions after the removal of pressure. The plastic materials utilized have a great deal of "spring-back" and, therefore, it is extremely difficult to provide the plastic with relatively permanent deformations.

It has been found that by using the dimensions and radii as herein set forth, it is possible to deform the plastic sufficiently to exceed the elastic limit and thereby minimize spring-back and yet avoid tearing or rupturing the plastic. The resultant article maintains its dimensional deformation even at temperature as high as 120–140° F.

Figure 5:
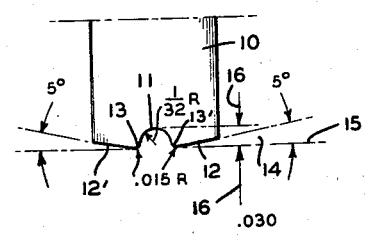
Fig. 5 is a front view of the die showing the preferred dimensions and angles.
Figure 6:
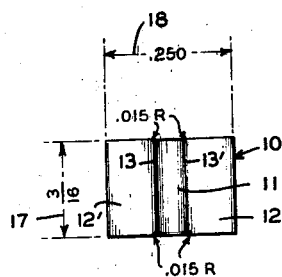
Fig. 6 is a plan view of the face of the die showing the various dimensions thereof.

The preferred dimensions when utilizing the plastics as herein described, and particularly when utilizing high density polyethylene, are illustrated in Figs. 5 and 6. The angle 14 defined by face section 12 and plane 15 is approximately 5° or in other words, the opposed faces of the dies define an angle of approximately 10°. Excellent results are obtained when the angle is 5°, but satisfactory results can be obtained when the angle is slightly above or below 5°. The angle of the die face functions not only to make a sufficiently sharp indentation at the point of contact with the tube to enable the pressure to exceed the elastic limit of the plastic, but also serves to control the width of the lateral projections.

When utilizing a tube having an external diameter of approximately .125" and an internal diameter of approximately .085", the radius of groove 11 is 1/32". The depth of the groove as shown by arrows 16 is .030".

In the preferred embodiment, the length of the die as shown by arrows 17 is 3/16" and the width of the die as shown by arrows 18 is .250". Of course, it is evident that these last mentioned dimensions are determined by the desired length of the intermediate portion. Furthermore, as can be seen from Fig. 4, the width of the die must be at least sufficiently wide to extend beyond the lateral extremities of the lateral projections.

As pointed out above, the angle of the die face affects the width of the lateral projections. The distance of travel of the dies also affects the width of the projections. Thus, to produce a tube having a projection width dimension of .205–.215" and utilizing a die face angle of 5°, the dies at the end of their travel will be .020" apart. The distance of travel of the dies is predetermined by the machine and the final spacing of the dies is one factor which determines the width of the lateral projections. In other words, as pointed out above, for the desired projection width the dies will be .020" apart at the end of their travel. To increase the projection width, the dies will be brought closer together and conversely, to decrease the projection width, the dies would be set further apart.

It is apparent that according to the above dimensions, when the dies are at the end of their travel, not only are the interior surfaces of the walls of the projections abutting each other, but the pressure is such that the walls are compressed to a thickness less than their original thickness between the forward edges 13 and 13' of the opposed dies. Since the external diameter of the tube is approximately .125" and the internal diameter is approximately .085", the thickness of the wall of the tube is approximately .02", namely, one-half the difference between the external and internal diameters. When the tube is compressed between the dies, the wall is doubled over, the superposed walls having a total thickness of approximately .04". Since the final spacing between the dies is .02", each wall is compressed to reduce its thickness to approximately one-half the original thickness.

It is also apparent that when the projections have a width dimension of .205–.215", the projections are wider than the width that could be obtained by merely flattening the tube. When the tube is merely flattened, the width cannot exceed one-half of the external circumference of the tube. One-half of the circumference would be one-half of .125 prior .196".

In addition, in order to prevent the dies from severing the plastic, the edges of the grooves 13 and 13' are radially curved with best results being obtained with the radius of curvature of approximately .015". Although the radius may vary from .015" it is preferably larger rather than smaller to reduce the possibility of cutting into the plastic.

The method of the present invention, therefore, comprises positioning the tube 1 in the groove 11 in opposed dies 10 and 10' and applying pressure to the dies to urge them toward each other.

These dies may be mounted in any conventional press or other device for urging the dies toward each other. When utilizing high density polyethylene, excellent results have been obtained when the pressure urging the dies together is approximately 2,000 pounds per square inch. However, satisfactory results can be obtained when the pressure varies between 1,500 and 3,000 pounds per square inch. When other plastic materials are used, the minimum pressure may be more or less and the pressure range may vary considerably. However, in any case the pressure must be at least sufficient to sufficiently deform the plastic to exceed the elastic limit of the plastic in order to result in a permanently deformed tube.

As can be seen from Fig. 4, during the application of the pressure and as a result of the angular positioning of the faces of the dies, the plastic material constituting the wall of the tube flows outwardly to form the lateral projections. In other words, the material of the tube is displaced outwardly to form these projections.

This method is preferably carried out in the cold or, in other word, at room temperature. However, if so desired, some heat may be utilized although the heat must obviously not be sufficiently great to cause the flow of plastic in the absence of the application of pressure.

The two dies 10 and 10' may be mounted in a conventional press for relative axial rectilinear movement of one die with respect to the other, either or both of the dies being capable of axial reciprocation, as desired.

Alternatively, one or more dies 10 may be mounted on the periphery of an annular or circular support and one or more dies 10' may be mounted on a similar support, the two supports being positioned so that the peripheries thereof define a single plane. Either or both supports may be capable of axial rotation. The respective die faces are brought into opposition with each other by relative axial rotation of their annular supports. Pressure is applied transversely of the axis of either or both supports to urge the respective die faces toward each other to deform the plastic tube positioned therebetween.

It is evident that the dies may constitute a set of jaws on a tip assembly machine and actuated by cams, thereby eliminating the necessity for separate operation for the projections. In other words, the projections may be formed on the same machinery which performs other functions on the tube.

The preferred plastic material is high density polyethylene. This high density polyethylene is commercially available and, per se, forms no part of the present invention. This polyethylene is generally made by the process known as the Ziegler process which is a process of polymerizing polyethylene in the presence of a catalyst utilizing low pressures. The catalyst may comprise a heavy metal halide such as titanium chloride as a carrier, a soluble metal alkyl or alkyl halide as an initiator and aliphatic or aromatic hydrocarbons as vehicles. By low pressures is meant pressure of about 20 atmospheres.

These high density polyethylenes are commercially available under the trade names Super Dylan (Koppers Company, Inc.); Marlex 50 (Phillips Chemical Company); Fortiflex A (Celanese Corporation of America); Hyfax (Hercules Powder Company). All of these high density polyethylenes are rigid or stiff materials and their stiffness in flexure, pounds per square inch (ASTM method D747–50) varies from 55,000 to 140,000, the stiffness of Super Dylan being 55,000–70,000; that of Marlex 50 being 140,000; that of Fortiflex A being 140,000, and that of Hyfax 75,000–125,000. The density of these commercially available high density polyethylenes varies from 0.945 to 0.97 gram per cc., the density of Super Dylan being between 0.95 and 0.97; Marlex being 0.958–0.962; Fortiflex being 0.96; and Hyfax being 0.945.

I claim:

1. In a method of making a ball point cartridge having a ball point writing tip at one end thereof, the steps of providing an elongated organic plastic tube and forming at least one lateral projection on a portion of said tube intermediate the extremities thereof by applying pressure to a segmental portion of said intermediate portion in a direction generally transverse to the axis of said tube to cause outward flow of the wall of said segmental portion, said pressure being sufficient to exceed the elastic limit of said plastic but short of the rupturing point of said plastic, and but short of the rupturing point of said plastic, and then releasing the pressure, said pressure being applied by a die, the face of which is rearwardly inclined with respect to the direction of movement of said die, said inclination being in an outward direction relative to the axis of said tube to form an angle with respect to a plane perpendicular to the direction of movement of said die, the mechanical properties of the plastic being such that the plastic will not rupture under said pressure and will maintain the deformation resulting from the flow of the plastic when the pressure is released.

2. In a method of making a ball point cartridge having a ball point writing tip at one end thereof, the steps of providing an elongated organic plastic tube and forming lateral projections on a portion of said tube intermediate the extremities thereof by applying pressure to opposed segmental portions of said intermediate portion in the absence of substantial compressive forces compressing the walls of said tube between said opposed segmental portions, said pressure being applied in a direction generally transverse to the axis of said tube to cause outward flow of the wall of each of said segmental portions, said pressure being sufficient to exceed the elastic limit of said plastic but short of the rupturing point of said plastic, and then releasing the pressure, said pressure being applied by at least one die whose face is rearwardly inclined with respect to the direction of movement of said die, said inclination being in an outward direction relative to the axis of said tube to form an angle with respect to a plane perpendicular to the direction of movement of said die, the mechanical properties of the plastic being such that the plastic will not rupture under said pressure and will maintain the deformation resulting from the flow of the plastic when the pressure is released.

3. A method as recited in claim 1, wherein said plastic is selected from the group consisting of nylon and high-density polyethylene.

4. A method as recited in claim 2, wherein the pressure is continued until the width of the compressed portion of the tube exceeds the width which could be obtained by merely flattening the tube without flowing of the plastic of the wall.

5. In a method of making a ball point cartridge having a ball point writing tip at one end thereof, the steps of providing an elongated organic plastic tube and forming at least one lateral projection on a portion of said tube intermediate the extremities thereof by applying pressure to a segmental portion of said intermediate portion in a direction generally transverse to the axis of said tube until the inner surfaces of the walls in said segmental portion contact each other and continuing the pressure to compress the walls and to cause outward flow of said walls, said pressure being sufficient to exceed the elastic limit of said plastic but short of the rupturing point of said plastic, and then releasing the pressure, said pressure being applied by a die the face of which is rearwardly inclined with respect to the direction of movement of said die, said inclination being in an outward direction relative to the axis of said tube to form an angle with respect to a plane perpendicular to the direction of movement of said die so that the greatest pressure is applied to the radially inward portion of said segmental portion with the pressure decreasing toward the radially outward extremity of said segmental portion, the mechanical properties of the plastic being such that the plastic will not rupture under said pressure and will maintain the deformation resulting from the flow of the plastic when the pressure is released.

6. A method as recited in claim 5, wherein the pressure is applied to two opposed segmental portions of said intermediate portion and wherein said pressure is applied in the absence of substantial compressive forces compressing the walls of said tube between said opposed segmental portions.

7. A method as recited in claim 6, wherein said plastic is selected from the group consisting of nylon and high-density polyethylene.

8. A method as recited in claim 7, wherein the pressure is applied by opposed dies, the inclined faces of said dies defining an angle of approximately 10°.

9. In a method of making a ball point cartridge having a ball point writing tip at one end thereof, the steps of providing an elongated organic plastic tube, positioning a portion of said tube intermediate the extremities thereof between opposed dies, each die having a groove in its face, said groove dividing the face into two sections, each section being rearwardly disposed, with respect to the direction of movement of said die, in a lateral direction from said groove at an angle of approximately 5° with respect to a plane perpendicular to the axis of said die, the external diameter of the tube exceeding the width of said groove, the tube being positioned in said groove so that the opposed faces of said dies contact opposed segmental portions of said intermediate portion, applying pressure to said dies in a direction generally transverse to the axis of said tube until the inner surfaces of the walls in said segmental portions contact each other, and continuing the pressure to compress said walls and to cause outward flow of said walls, said pressure being applied in the absence of substantial compressive forces compressing the walls of said tube between said opposed segmental portions, said pressure being sufficient to exceed the elastic limit of said plastic but short of the rupturing point of said plastic, and then releasing the pressure, the mechanical properties of the plastic being such that the plastic will not rupture under said pressure and will maintain the deformation resulting from the flow of the plastic when the pressure is released.

10. A method as recited in claim 9, wherein said plastic is a high-density polyethylene.

11. In a method of making a ball point cartridge comprising an organic plastic tubular writing fluid-containing reservoir having a ball point writing tip at one end thereof and at least one lateral projection defining a seat for a retract spring, the steps of providing an elongated organic plastic reservoir tube, and forming at least said one lateral projection on a portion of said tube intermediate the extremities thereof without closing off the bore of said intermediate portion so that writing fluid flows to said ball point writing tip when the cartridge is in use, said forming being effected by applying pressure to a segmental portion of said intermediate portion in a direction generally transverse to the axis of said tube to cause outward flow of the wall of said segmental portion, said pressure being sufficient to exceed the elastic limit of the plastic of said intermediate portion but short of the rupturing point of said plastic and then releasing said pressure, the mechanical properties of the plastic being such that the plastic will not rupture under said pressure and will maintain the deformation resulting from the flow of the plastic when the pressure is released.

12. In a method of making a ball point cartridge comprising an organic plastic tubular writing fluid-containing reservoir having a ball point writing tip at one end thereof and lateral projections defining a seat for a retract spring, the steps of providing an elongated organic plastic reservoir tube, and forming lateral projections on a portion of said tube intermediate the extremities thereof, without closing off the bore of said intermediate portion so that writing fluid flows to said ball point writing tip when the cartridge is in use, said forming being effected by applying pressure to opposed segmental portions of said intermediate portion while maintaining the walls of said tube between said opposed segmental portions free of substantial compressive forces, said pressure being applied in a direction generally transverse to the axis of said tube to cause outward flow of the wall of each of said segmental portions, said pressure being sufficient to exceed the elastic limit of the plastic of said intermediate portion but short of the rupturing point of said plastic, and then releasing the pressure, the mechanical properties of the plastic being such that the plastic will not rupture under said pressure and will maintain the deformation resulting from the flow of the plastic when the pressure is released.

13. In a method of making a ball point cartridge comprising an organic plastic tubular writing fluid-containing reservoir having a ball point writing tip at one end thereof and lateral projections defining a seat for a retract spring, the steps of providing an elongated organic plastic reservoir tube, and forming lateral projections on a portion of said tube intermediate the extremities thereof, without closing off the bore of said intermediate portion so that writing fluid flows to said ball point writing tip when the cartridge is in use, said forming being effected by applying pressure to opposed segmental portions of said intermediate portion while maintaining the walls of said tube between said opposed segmental portions free of substantial compressive forces, the greatest pressure being applied to the radially inward portions of said segmental portions with the pressure decreasing toward the radially outward extremities of said segmental portions, said pressure being applied in a direction generally transverse to the axis of said tube to cause outward flow of the wall of each of said segmental portions, said pressure being sufficient to exceed the elastic limit of the plastic of said intermediate portion but short of the rupturing point of said plastic, and then releasing the pressure, the mechanical properties of the plastic being such that the plastic will not rupture under said pressure and will maintain the deformation resulting from the flow of the plastic when the pressure is released.

References Cited in the file of this patent

UNITED STATES PATENTS

| Number | Name | Date |
|---|---|---|
| 352,656 | Parker | Nov. 16, 1886 |
| 1,070,379 | Summey | Aug. 12, 1913 |
| 1,404,320 | Roberts et al. | Jan. 24, 1922 |
| 1,494,072 | Marshall | May 13, 1924 |
| 1,727,896 | Mraz | Sept. 10, 1929 |
| 2,038,535 | Brenizer | Apr. 28, 1936 |
| 2,205,893 | Unger | June 25, 1940 |
| 2,244,208 | Miles | June 3, 1941 |
| 2,652,032 | Lipic | Sept. 15, 1953 |
| 2,660,152 | Randolph | Nov. 24, 1953 |
| 2,688,775 | Scherer et al. | Sept. 14, 1954 |
| 2,746,087 | Doleza | May 22, 1956 |
| 2,758,491 | Buchanan | Aug. 14, 1956 |
| 2,803,695 | Woolley | Aug. 20, 1957 |